(12) United States Patent
Gordon et al.

(10) Patent No.: US 10,048,805 B2
(45) Date of Patent: Aug. 14, 2018

(54) SENSOR CONTROL

(71) Applicant: Lenovo (Singapore) Pte. Ltd., Singapore (SG)

(72) Inventors: Julie Anne Gordon, Flower Mound, TX (US); James S. Rutledge, Durham, NC (US); Bradley Park Strazisar, Cary, NC (US); Aaron Michael Stewart, Raleigh, NC (US); Jay Wesley Johnson, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/837,103

(22) Filed: Aug. 27, 2015

(65) Prior Publication Data
US 2015/0370362 A1 Dec. 24, 2015

Related U.S. Application Data

(63) Continuation of application No. 12/943,777, filed on Nov. 10, 2010, now Pat. No. 9,122,323.

(51) Int. Cl.
G06F 3/042 (2006.01)
G06F 3/02 (2006.01)
G06F 1/16 (2006.01)
G06F 3/0354 (2013.01)

(52) U.S. Cl.
CPC .............. *G06F 3/042* (2013.01); *G06F 1/169* (2013.01); *G06F 1/1662* (2013.01); *G06F 3/0227* (2013.01); *G06F 3/03547* (2013.01); G06F 2203/0338 (2013.01)

(58) Field of Classification Search
CPC ..... G09G 5/00; G06F 3/02; G06F 3/0213; G06F 3/03547; G06F 1/1662; G06F 1/169; G06F 2203/0338
See application file for complete search history.

(56) References Cited

U.S. PATENT DOCUMENTS

| | | | | |
|---|---|---|---|---|
| 5,841,425 A * | 11/1998 | Zenz, Sr. | ............... | G06F 3/0213 345/158 |
| 6,697,054 B1* | 2/2004 | Kamizono | ............ | G06F 3/0219 341/22 |
| 2001/0040557 A1* | 11/2001 | Selker | ................... | G06F 1/1613 345/168 |
| 2002/0118164 A1* | 8/2002 | Buss | ................... | G06F 3/03543 345/156 |
| 2003/0117370 A1* | 6/2003 | Van Brocklin | ....... | G06F 1/1616 345/156 |
| 2006/0132447 A1* | 6/2006 | Conrad | ................. | G06F 3/0219 345/168 |
| 2012/0038674 A1* | 2/2012 | Stergiou | ................ | G06F 3/0213 345/650 |

* cited by examiner

*Primary Examiner* — Bryan Earles
(74) *Attorney, Agent, or Firm* — Brian J. Pangrle

(57) ABSTRACT

An apparatus can include a left optical trackpad that, responsive to object sensing, outputs a left optical trackpad signal; a right optical trackpad that, responsive to object sensing, outputs a right optical trackpad signal; assignment circuitry that assigns a status to the optical trackpads that is a right hand dominant status or a left hand dominant status; and control circuitry that outputs one or more commands based at least in part on the status and at least one of the right optical trackpad signal and the left optical trackpad signal.

19 Claims, 8 Drawing Sheets

GUI(s) 710

Fixed: ☐                                                    712

RH: ☐   LH: ☐   First Used: ☐

---

Auto-Adjusting: ☐                                           714

Sweep: ☐   Code: ☐   Double-Sweep Retention: ☐

---

Associations:                                               716
    Dominant Sweep =
    Nondominant Tap =
    Dominant Sweep + Nondominant Tap =
    Dominant Sweep + Nondominant Cover =
    ⋮

---

Applications: ☐       App 1: ☐                              718
                  App 2: ☐
                  ⋮
                  App N: ☐

FIG. 7

SENSOR CONTROL

RELATED APPLICATIONS

This application is a continuation of a U.S. patent application having Ser. No. 12/943,777, filed 10 Nov. 2010, which is incorporated by reference herein.

TECHNICAL FIELD

Subject matter disclosed herein generally relates to techniques for controlling sensors.

BACKGROUND

A user of computer keyboard may be right hand dominant, left hand dominant or ambidextrous. Various keyboards are used in conjunction with other input devices such as a mouse, which is typically placed to the right of the keyboard or the left of the keyboard. Newer types of input devices are emerging, some of which are fixed (e.g., integrated into a keyboard). As described herein, various technologies provide for enhanced control of input device that are associated with a keyboard.

SUMMARY

An apparatus includes sensors configured to sense optical information, assignment circuitry configured to assign a dominant status to one of the sensors and a nondominant status to another one of the sensors and control circuitry configured to output one or more commands based on sensed optical information and status. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

FIG. 7 is a diagram of an example of a graphical user interface; and

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
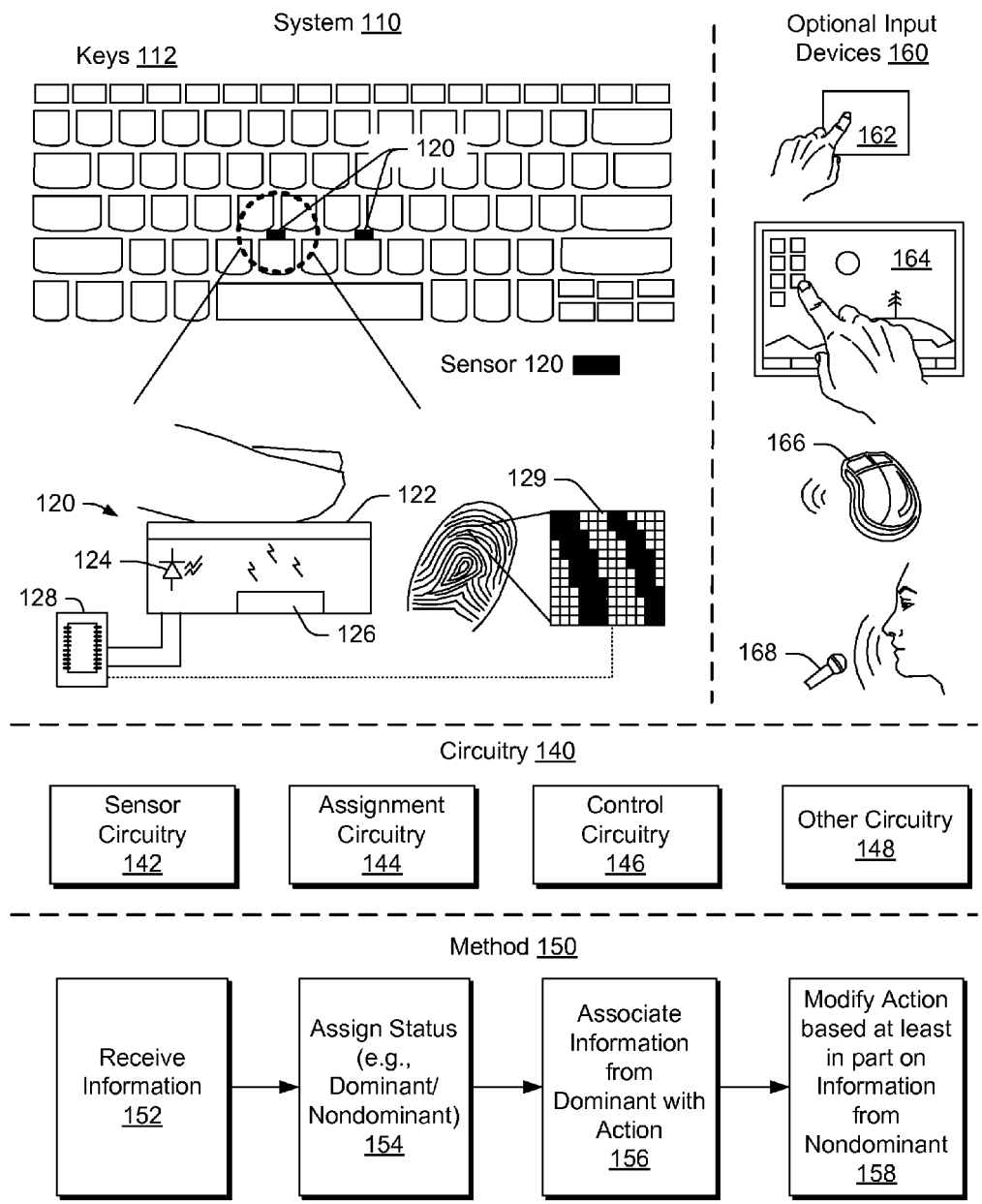
FIG. 1 is a series of diagrams of examples of a system, optional inputs, circuitry, and a method.

FIG. 1 shows an example of a system 110 that includes keys 112 and sensors 120. As shown, the system 110 is arranged as a computer keyboard with various character keys 112 and two sensors 120. Each of the sensors 120 may be configured as a so-called "optical trackpad". An optical trackpad is generally a sensor shaped as a "pad" configured to track an object using optical components. As described herein, tracking can include, for example, detecting presence or an object or objects, absence of an object or objects or motion of an object or objects.

An approximate diagram of an example of the sensor 120 is shown in FIG. 1. In the example of FIG. 1, the sensor 120 includes a surface 122, an emitter 124, a detector 126, and circuitry 128, which may be configured to output sensed information in the form of a digital array 129. For example, an object may be a finger or other object with surface indicia (e.g., consider fingerprint ridges, striations, or other indicia). When such an object contacts or comes into close proximity to the surface 122, surface indicia of the object are illuminated by radiation emitted by the emitter 124 (e.g., an emitting diode). Radiation reflected by the object (e.g., optionally due to impedance/index of refraction changes of a boundary of the surface 122) is detected by the detector 126. The detector 126 may be a CCD or other type of detector.

With respect to the circuitry 140, as described herein, sensor circuitry 142 may include a sensor, sensors or circuitry configured to receive information directly or indirectly from one or more sensors. Sensor circuitry 142 may include a multiplexer configurable to receive information from one or more sensors (e.g., a left sensor, a right sensor or both a left sensor and a right sensor). Sensor circuitry 142 may include one or more of an amplifier, a filter, or other component(s) for processing information. Sensor circuitry 142 may conform to one or more communication standards (e.g., bus, wired, wireless, etc.).

As described herein, a sensor or sensor circuitry may operate according to one or more algorithms that can output information that corresponds to planar coordinates (e.g., x, y). For example, a sensor or sensor circuitry may output one or more x, y, $\Delta$x, $\Delta$y, etc., values. A sensor or sensor circuitry may include a sampling rate such that, for example, values for x, y, $\Delta$x, $\Delta$y, etc., may be determined with respect to time.

As described herein, assignment circuitry 144 is configured to assign status to one or more sensors. For example, status may be "right", "left", "dominant", "nondominant", "enabled", "disabled", "filtered", "unfiltered", etc. In the example of FIG. 1, control circuitry 146 is optionally configured to receive one or more status indicators for one or more sensors. For example, where one of the sensors 120 is assigned a dominant status by the assignment circuitry 144 and the other one of the sensors 120 is assigned a nondominant status by the assignment circuitry 144, the control circuitry 146 may respond to sensed information from one or more of the sensors 120 based at least in part on assigned status. As described herein, the assignment circuitry 144 may assign status to one or more sensors based at least in part on information sensed by one or more sensors. In FIG. 1, other circuitry 148 may be configured to operate in conjunction with the sensor circuitry 142, the assignment circuitry 144 or the control circuitry 146.

In FIG. 1, a method 150 includes a reception block 152 for receiving information, an assignment block 154 for assigning a dominant status and a nondominant status (e.g., optionally by default), an association block 156 for associating information from a dominant sensor with an action and a modification block 158 for modifying the action based on information from a nondominant sensor. For example, sweeping a finger over a right sensor may result in the assignment block 154 assigning the right sensor a dominant status and assigning a left sensor a nondominant status. In such an example, subsequent sweeping of a finger over the dominant sensor may cause the association block 156 to associate information from the dominant sensor with a pan (or other) action. Where another finger is placed over the nondominant sensor, the modification block 158 may cause the pan (or other) action to be modified, for example, by causing selection of a graphical object rendered to a display and movement of the selected graphical object based on information generated by the sweeping of the finger over the dominant sensor. In other words, a simple sweep over a dominant sensor may pan, for example, an image rendered to a display whereas placement of a finger over a nondominant sensor may select an image rendered to a display and the sweep over the dominant sensor move the rendered image on the display. In another example, simultaneous sweeping of a finger over the dominant sensor and sweeping of a finger over the nondominant sensor may be associated with a "gesture", for example, to zoom where the amount of zoom is controlled by information sensed by the dominant sensor (e.g., speed of sweep, degree of sweep, etc.).

FIG. 1 also shows various optional input devices 160, including a touchpad 162, a touchscreen 164, a mouse 166 and a microphone 168. Such devices may be optionally used in conjunction with one or more of the sensors 120.

Figure 2:
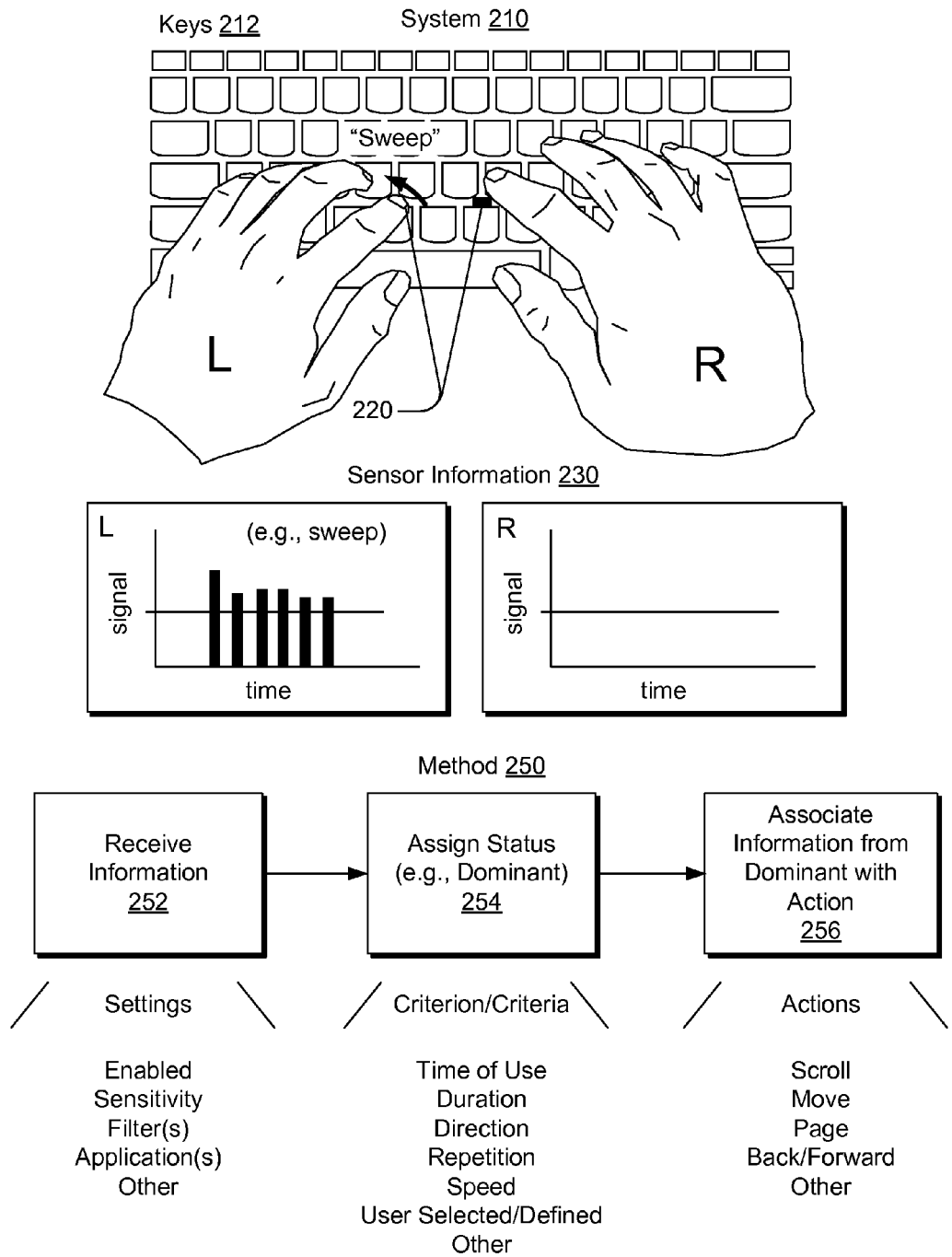
FIG. 2 is a series of diagrams of examples of a system, sensor information and a method.

FIG. 2 shows an example of a system 210 that includes keys 212 and left and right optical sensors 220. In the example of FIG. 2, a user's left index finger (e.g., an object) sweeps past the left optical sensor. In response, the left optical sensor provides sensor information 230 such as a signal with respect to time indicative of the sweeping motion of the left index finger. For example, the left optical sensor may output a signal that depends on how many fingerprint ridges were detected across a particular portion of the sensor's field of view, alternatively, the signal may depend on tracking one or more ridges or portions thereof. As shown, the user's right index finger is not in contact with the right optical sensor. Accordingly, the right optical sensor provides no signal or other information indicative of absence of an object in the right optical sensor's field of view.

FIG. 2 also shows an example of a method 250 that includes a reception block 252 for receiving sensor information, an assignment block 254 for assigning status to one or more sensors and an association block 256 for associating sensed information with an action based at least in part on status. For example, where a user sweeps one of her five fingers over the left optical sensor, the left optical sensor may be assigned a dominant status, which may correspond to the user's dominant hand, and, for example, where another user sweeps one of his five fingers over the right optical sensor, the right optical sensor may be assigned a dominant status, which may correspond to the user's dominant hand. Accordingly, as described herein, a system with keys and sensors may (e.g., via a simple finger sweep) accommodate a left hand dominant user and accommodate a right hand dominant user.

As described herein, one or more settings may be set that have at least some relationship to a sensor or sensed information (e.g., via one or more of sensor circuitry, assignment circuitry, control circuitry, or other circuitry). In the example of FIG. 2, settings may include one or more of an enable/disable setting, a sensitivity setting, a filter setting, an application specific setting, or another setting.

As described herein, an assignment process (e.g., implemented via one or more of sensor circuitry, assignment circuitry, control circuitry, or other circuitry) may assign status based on a criterion or criteria such as one or more of a time of use criterion, a duration criterion, a direction criterion, a repetition criterion, a speed criterion, a user selected/defined criterion or another criterion.

As described herein, an association process (e.g., implemented via one or more of sensor circuitry, assignment circuitry, control circuitry, or other circuitry) may associate sensed information, based at least in part on status, with an action such as, for example, a scroll action, a move action, a page change action, a back action, a forward action or another action.

Figure 3:
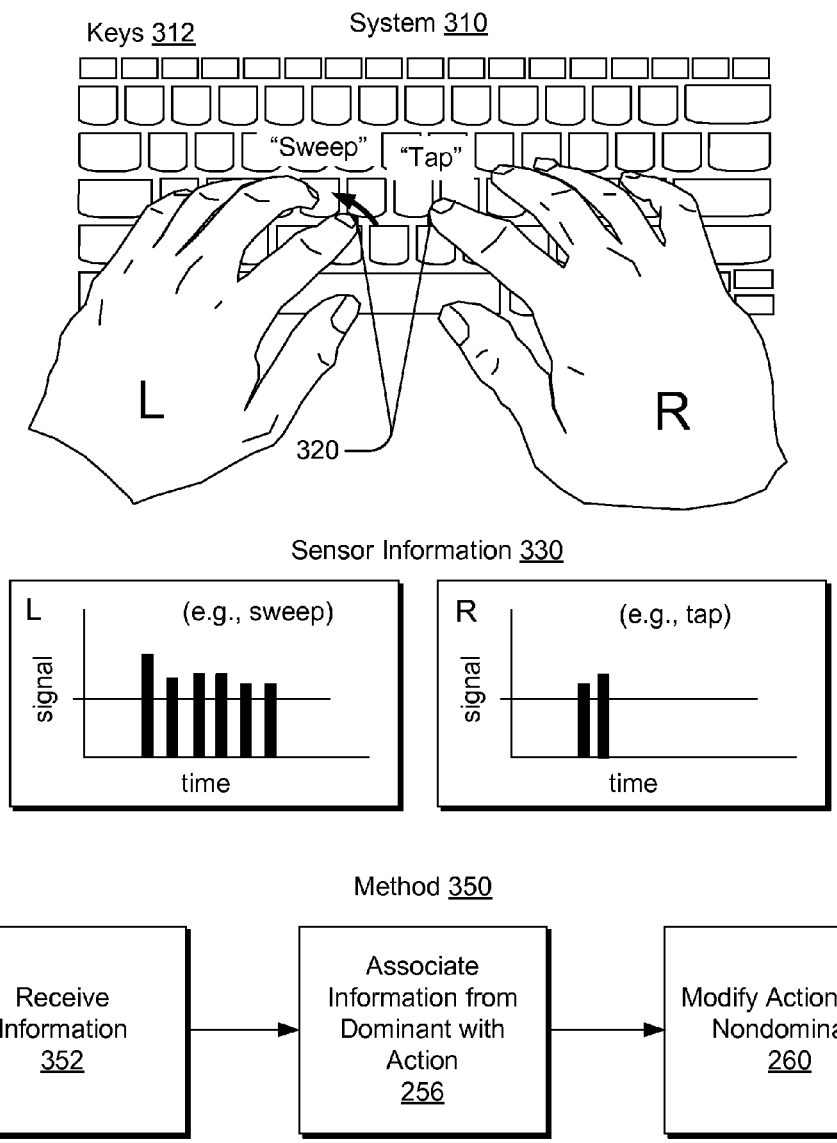
FIG. 3 is a series of diagrams of examples of a system, sensor information and a method.

FIG. 3 shows an example of a system 310 that includes keys 312 and left and right optical sensors 320. In the example of FIG. 3, a user's left index finger (e.g., an object) sweeps past the left optical sensor and the user's right index finger (e.g., an object) taps the right optical sensor. In response, the left optical sensor provides sensor information 330 such as a signal with respect to time indicative of the sweeping motion of the left index finger and the right optical sensor provides sensor information 330 indicative of the tap.

FIG. 3 also shows an example of a method 350 that includes a reception block 352 for receiving sensor information, an association block 256 for associating sensed information from a sensor with a dominant status with an action and a modification block 260 for modifying the action based at least in part on sensed information from a sensor with a nondominant status.

As described herein, a method can include receiving information from an optical sensor, responsive to receipt of the information, assigning the optical sensor as a dominant optical sensor and assigning another optical sensor as a nondominant optical sensor and associating information received from the dominant optical sensor with an action and modifying the action based at least in part on information received from the nondominant optical sensor. In such a method, the assigning may include assigning the dominant optical sensor as corresponding to dominant handedness of a user. As described herein, receiving a signal may include receiving a signal corresponding to sweeping of an object across the optical sensor. As described herein, reassigning a dominant optical sensor as a nondominant optical sensor may occur based at least in part on input from the nondominant optical sensor.

Figure 4:
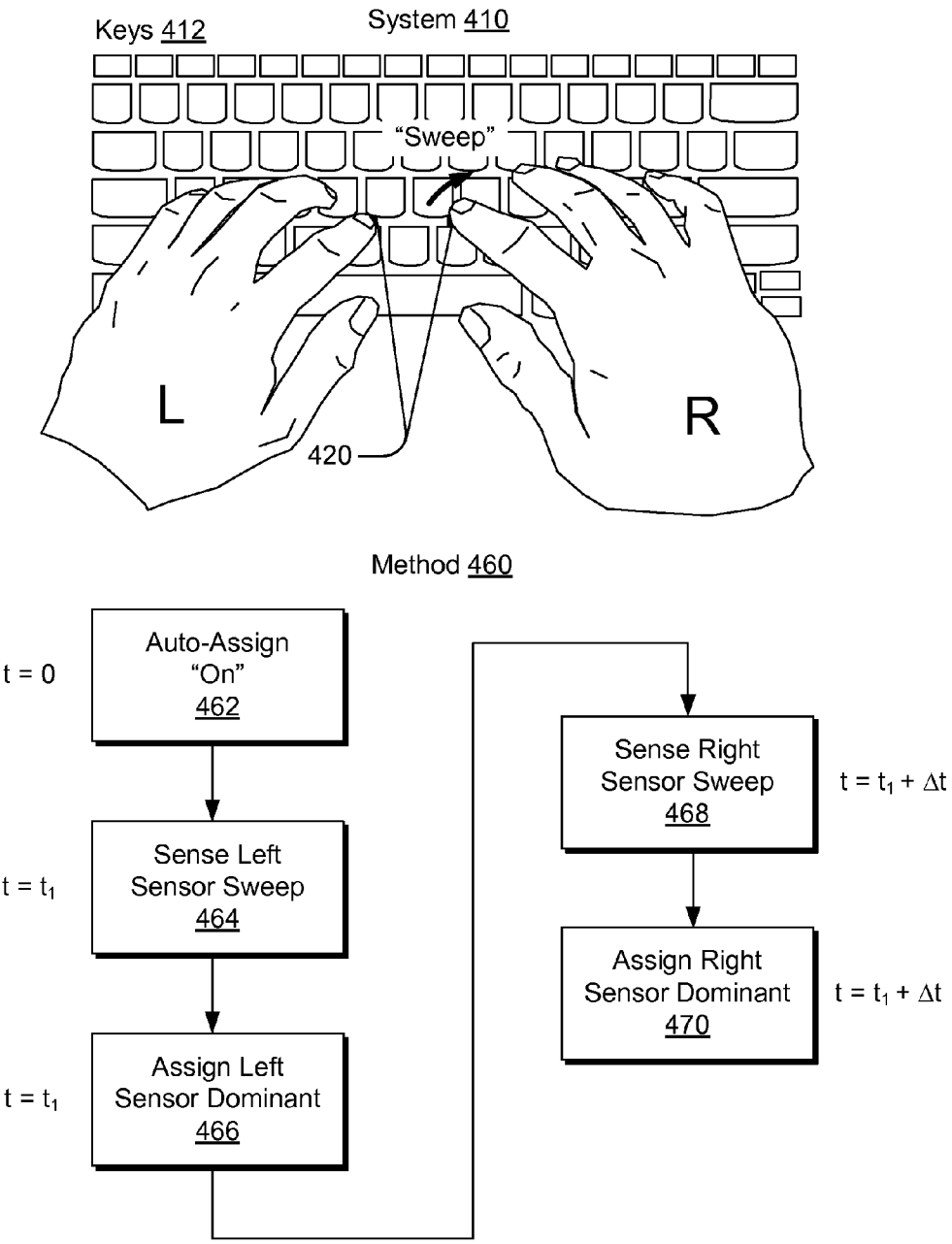
FIG. 4 is a series of diagrams of examples of a system and a method.

FIG. 4 shows an example of a system 410 that includes keys 412 and left and right optical sensors 420. In the example of FIG. 4, at a time of $t=t_1$, a user's left index finger (e.g., an object) sweeps past the left optical sensor and, at a time of $t=t_1+\Delta t$, a user's right index finger (e.g., an object) sweeps past the right optical sensor.

FIG. 4 also shows an example of a method 460 that covers times $t_1$ and $t_1+\Delta t$. In an enablement block 462, at time $t=0$, an automatic assignment functionality is enabled (e.g., turned "on"). In a sense block 464, at time $t=t_1$, a sweeping motion is sensed by a left sensor. In response to the sensed sweeping action, an assignment block assigns the left sensor a dominant status. At a later time, $t=t_1+\Delta t$, in a sense block 468, a sweeping motion is sensed by a right sensor. In response to the sensed sweeping action, an assignment block 470 assigns the right sensor a dominant status (e.g., which re-assigns the left sensor to a nondominant status). Accordingly, in such a method a user can change the status of one or more sensors.

Figure 5:
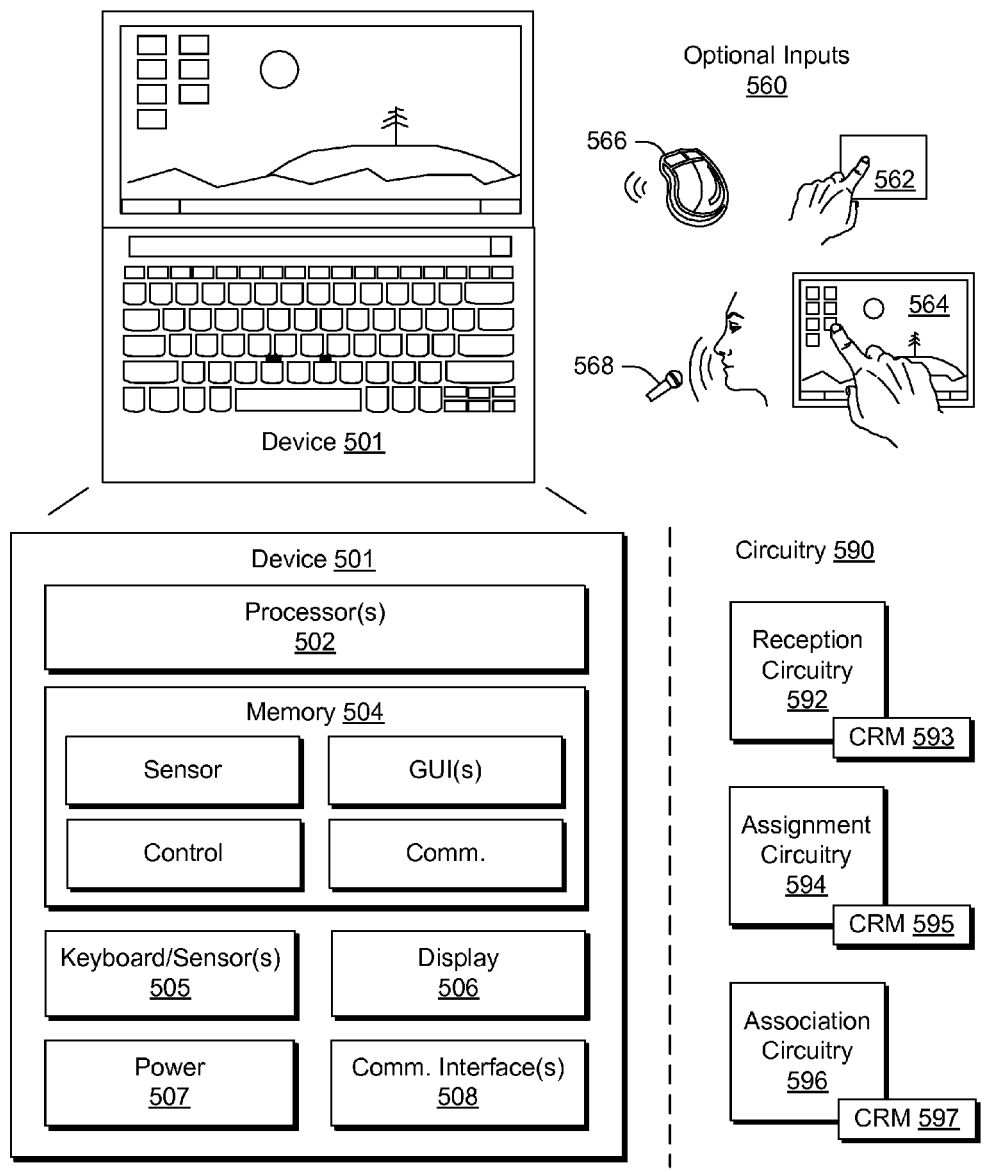
FIG. 5 is a series of diagrams of examples of a device, optional inputs and circuitry.

FIG. 5 shows an example of a device 501, some examples of circuitry 590 that may be included in the device 501 and some other, optional input devices 560. In the example of FIG. 5, the device 501 includes one or more processors 502 (e.g., cores), memory 504, a keyboard with one or more sensors 505, a display 506, a power supply 507 and one or more communication interfaces 508. As described herein, a communication interface may be a wired or a wireless interface. In the example of FIG. 5, the memory 504 can include one or more modules such as, for example, a sensor module, a control module, a GUI module and a communication module. Such modules may be provided in the form of instructions, for example, directly or indirectly executable by the one or more processors 502.

The device 501 may include the circuitry 590. In the example of FIG. 5, the circuitry 590 includes reception circuitry 592, assignment circuitry 594 and association circuitry 596. Such circuitry may optionally rely on one or more computer-readable media that includes computer-executable instructions. For example, the reception circuitry 592 may rely on CRM 593, the assignment circuitry 594 may rely on CRM 595 and the association circuitry 596 may rely on CRM 597. While shown as separate blocks, CRM 593, CRM 595 and CRM 597 may be provided as a package (e.g., optionally in the form of a single computer-readable storage medium). As described herein, a computer-readable medium may be a storage device (e.g., a memory card, a storage disk, etc.) and referred to as a computer-readable storage medium.

As described herein, the device 501 may include or be part of a system that includes one or more of a touchpad 562, a touchscreen 564, a mouse 566 or a microphone 568. The device 501 may include or be part of a system that includes a video camera (e.g., a webcam), which may be configured to recognize or track user input.

As described herein, one or more computer-readable media can include computer-executable instructions to instruct a computer to receive a signal from an optical sensor, responsive to receipt of the signal, assign the optical sensor as a dominant optical sensor and assign another optical sensor as a nondominant optical sensor, associate input from the dominant optical sensor with an action, associate input from the nondominant optical sensor with an action and associate input from the dominant optical sensor and input from the nondominant optical sensor with an action. In such an example, the one or more computer-readable media may further include computer-executable instructions to instruct a computer to reassign the dominant optical sensor as a nondominant optical sensor based at least in part on input received from the nondominant optical sensor (see, e.g., the example method 460 of FIG. 4).

Figure 6:
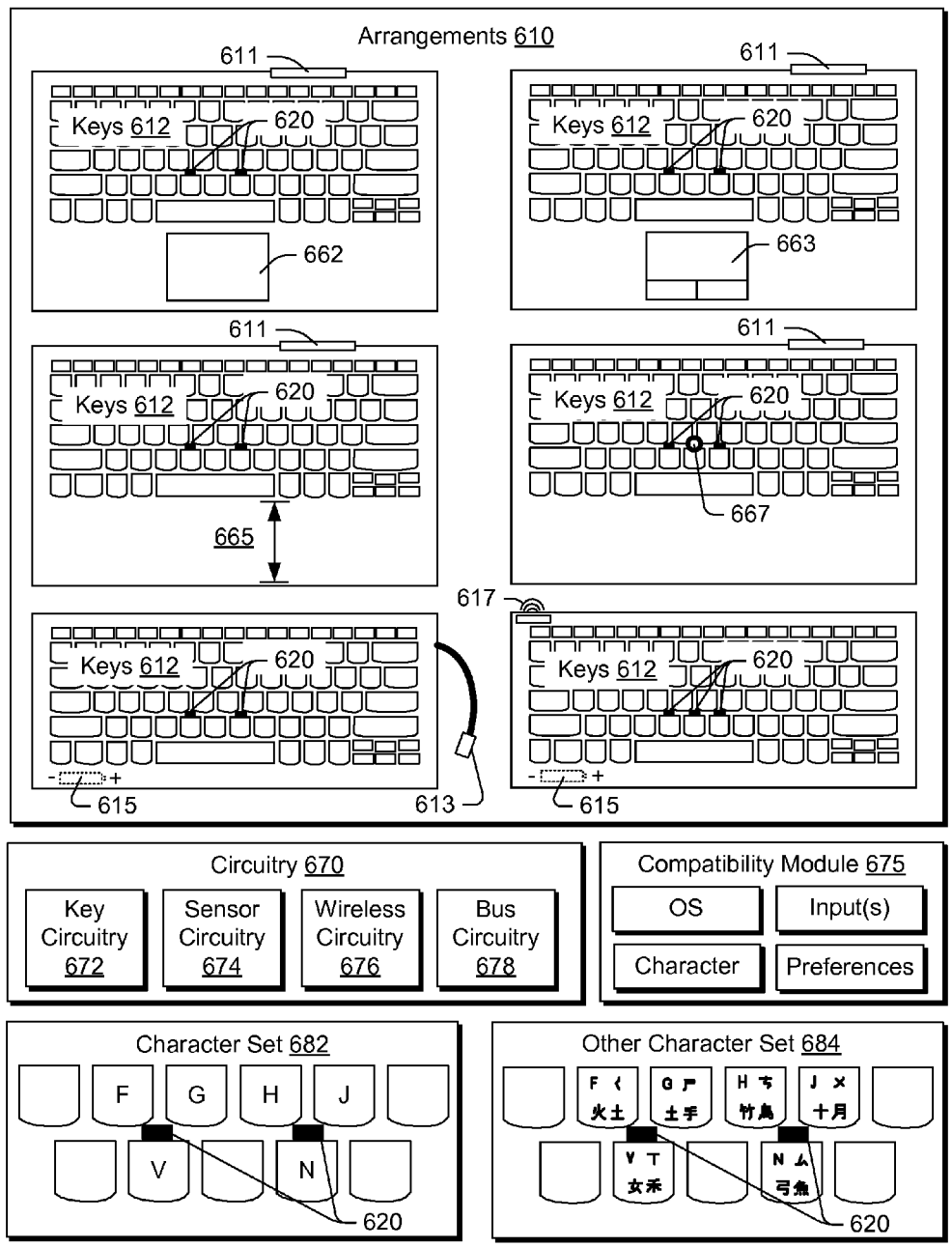
FIG. 6 is a series of diagrams of examples of arrangements, circuitry, modules and character sets.

FIG. 6 shows various examples of arrangements 610, circuitry 670, a compatibility module 675 and character sets 682 and 684. In the various arrangements 610, a system with keys 612 and sensors 620 may optionally include one or more of an interface 611, a touchpad 662, a touchpad with associated buttons 663, a hand rest 665, a joystick 667, a communication cable 613 (e.g., USB or other, optionally configured to supply power), a power supply 615 (e.g., one or more batteries) and a wireless communication interface 617. As indicated, an arrangement may include more than two optical sensors (see, e.g., lower left example arrangement).

As described herein, a system may include the circuitry 670, which may include one or more of key circuitry 672, sensor circuitry 674, wireless communication circuitry 676 and bus circuitry 678.

As described herein, a compatibility module may be provided to allow for compatibility of a system. For example, the compatibility module 675 can include operating system (OS) compatibility configuration instructions, character set configuration instructions, input compatibility configuration instructions, preference configuration instructions, etc.

In the example of FIG. 6, the character set 682 includes F, G and V keys and H, J and N keys and left and right optical sensors 620. In this example, a left optical sensor is positioned adjacent to at least one or more of an F key, a G key and a V key and a right optical sensor is positioned adjacent to at least one or more of an H key, a J key and a N key. In the example of one or more additional or other character set 684, a left optical sensor is positioned adjacent to three keys and a right optical sensor is positioned adjacent to three keys. As described herein, one or more optical sensors may be positioned adjacent to one or more keys and generally at least two keys of a keyboard associated with one or more character sets.

FIG. 7 shows various example graphical user interfaces (GUIs) 710. As described herein, a device (e.g., the device 501 of FIG. 5) may include circuitry configured for presentation of one or more GUIs. In the example of FIG. 7, a GUI may include fixed GUI controls 712, auto-adjusting GUI controls 714, association GUI controls 716, application GUI controls 718 or one or more additional or other GUI controls.

As to the fixed GUI controls 712, a device may receive information to select a "fixed" option that instructs the device to fix a right optical sensor as dominant, to fix a left optical sensor as dominant or to optionally assign a first used optical sensor as dominant.

As to the auto-adjusting GUI controls 714, a device may receive information to select an auto-adjusting option that instructs the device to assign optical sensor status (e.g., dominant or nondominant) based on a sweep or a code (e.g., tap, sweep, tap). Such a GUI controls 714 may include a double-sweep retention option where upon sensing of substantially simultaneous sweeps, assignment status remains unchanged (e.g., if a right optical sensor was assigned a dominant status, a double-sweep of both right and left optical sensors would not change the dominant status of the right optical sensor).

As to the associations GUI controls 716, default associations may be set. However, options may exist for receipt of input to associate actions with sensed information. For example, sensed information indicative of a dominant sweep, a nondominant sweep, a dominant tap, a nondominant tap, a dominant sweep and a nondominant tap, a dominant sweep and a nondominant cover, etc., may be associated with one or more actions, which may be selected, for example, based on user input.

As to the applications GUI controls 718, an option may exist to link one or more optical sensors, or responses to sensed information, to one or more applications. In such an example, each application may have associations specific to that application. For example, a media player application may include associations such as dominant sweep to the right corresponds to a forward media action and a dominant sweep to the left corresponds to a rewind media action. In such an example, a cover of a nondominant sensor during a sweep may correspond to a fast forward media action or a fast rewind media action. For a game application, various associations may be set to allow for enhanced interaction with the game application (e.g., avatar movements, actions, etc.).

As described herein, in a fixed mode of operation, a first sensor used to move a cursor rendered to a display can be assigned a primary or dominant status. In such an example, another sensor may be assigned a modifier or nondominant status. As described herein, to move a cursor, a user can sweep his finger over an optical sensor where, if the user uses the right optical sensor first, a status of "right handed" may be established and where, if the user uses the left optical sensor first, a status of "left handed" may be established. Such "first use" may be based on time of a start-up, resumption from a low power state, etc. As mentioned, an option may exist for a user to manually set or switch the handedness, if desired. As described herein, a process of determining primary and modifier can enable various uses of one or more input devices (e.g., optical sensors or other), including uses such as area selection, left and right clicks, select gestures, etc. As described herein, a device can include circuitry to assign a dominant status to a sensor where that sensor is a primary sensor and where another sensor with a nondominant status is a modifier sensor to modify output associated with the primary sensor.

In an example of an auto-adjusting assignment mode, a first optical sensor to be touched in a sweeping motion may be assigned a primary or dominant status. Such a sensor may retain its primary or dominant status until occurrence of a sweeping motion along another optical sensor. If a right optical sensor and a left optical sensor detect sweeping motion, such as during a gesture, then whichever sensor had primary or dominant status before the gesture keeps its primary or dominant status. As mentioned (see, e.g., the GUI 710), a device may be configured to allow a user to optionally manually set handedness (e.g., status) and optionally disable an auto-detect feature or an auto-adjusting feature.

As described herein, a device can include sensors configured to sense optical information, assignment circuitry configured to assign a dominant status to one of the sensors and a nondominant status to another one of the sensors and control circuitry configured to output one or more commands based on sensed optical information and status. In such a device, the sensors may include a left sensor and a right sensor optionally where the dominant status sensor corresponds to a dominant hand of a user. While some examples refer to optical sensors, various techniques described herein may optionally be applied to one or more other types of sensors. For example, sensors positioned akin to the sensors 220, 320, 420 or 620 may be configured to sense capacitive information or one or more other types of information. As to capacitive information, a sensor may include one or more electrodes configured for formation of a virtual capacitor or virtual capacitors (e.g., where a human finger forms a virtual capacitor plate). For example, an appropriately timed sweeping action over an electrode array of a capacitive sensor may provide information sufficient for assignment of a dominant status to that sensor.

As described herein, a device can include assignment circuitry that includes circuitry to assign a dominant status to a sensor based on information received from one of two or more sensors. In such an example, the information received can correspond to a signal generated by the one of the sensors responsive to an object sweeping across that sensor (e.g., touching or in close proximity to the sensor) and may correspond to an initial session signal generated by the one of two or more sensors. As described herein, a device can include assignment circuitry that includes circuitry to reassign a nondominant status to a dominant status based on information received from one of two or more sensors.

In various examples, a keyboard (e.g., a computer keyboard) includes two or more sensors with, for example, at least two keys adjacent one of the sensors and at least two different keys adjacent another one of the sensors. As shown in the example character set 682 of FIG. 6, at least two keys can include an F key and at least two different keys can include a J key.

As described herein, a device can include assignment circuitry that includes circuitry to assign a dominant status based on information associated with an assignment control of a graphical user interface (GUI).

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 8:
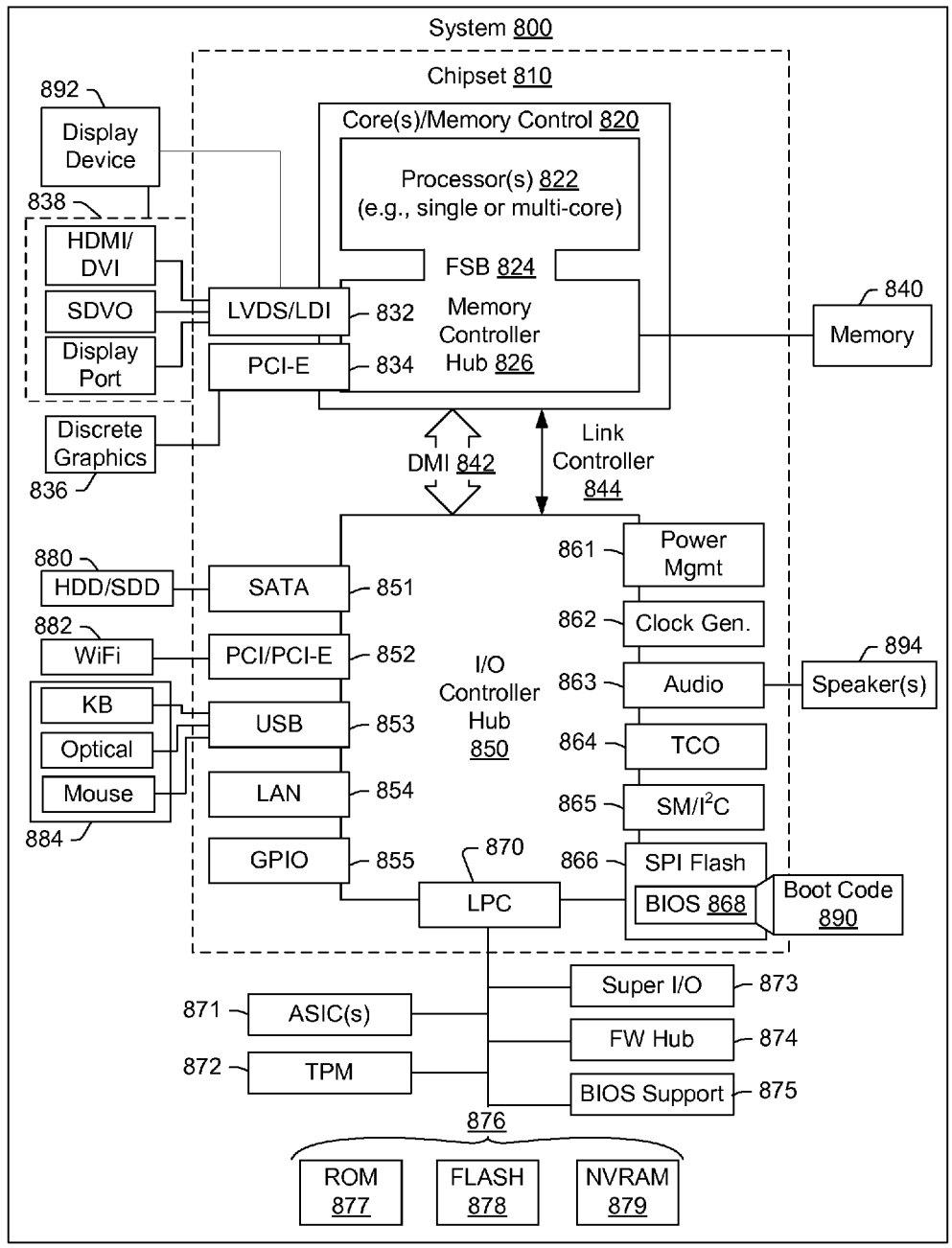
FIG. 8 is a diagram of an example of a machine.

While various examples of circuits or circuitry have been discussed, FIG. 8 depicts a block diagram of an illustrative computer system 800. The system 800 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 800. As described herein, a device such as the device 501 may include at least some of the features of the system 800.

As shown in FIG. 8, the system 800 includes a so-called chipset 810. A chipset refers to a group of integrated circuits, or chips, that are designed to work together. Chipsets are usually marketed as a single product (e.g., consider chipsets marketed under the brands INTEL®, AMD®, etc.).

In the example of FIG. 8, the chipset 810 has a particular architecture, which may vary to some extent depending on brand or manufacturer. The architecture of the chipset 810 includes a core and memory control group 820 and an I/O controller hub 850 that exchange information (e.g., data, signals, commands, etc.) via, for example, a direct management interface or direct media interface (DMI) 842 or a link controller 844. In the example of FIG. 8, the DMI 842 is a chip-to-chip interface (sometimes referred to as being a link between a "northbridge" and a "southbridge").

The core and memory control group 820 include one or more processors 822 (e.g., single core or multi-core) and a memory controller hub 826 that exchange information via a front side bus (FSB) 824. As described herein, various components of the core and memory control group 820 may be integrated onto a single processor die, for example, to make a chip that supplants the conventional "northbridge" style architecture.

The memory controller hub 826 interfaces with memory 840. For example, the memory controller hub 826 may provide support for DDR SDRAM memory (e.g., DDR, DDR2, DDR3, etc.). In general, the memory 840 is a type of random-access memory (RAM). It is often referred to as "system memory".

The memory controller hub 826 further includes a low-voltage differential signaling interface (LVDS) 832. The LVDS 832 may be a so-called LVDS Display Interface (LDI) for support of a display device 892 (e.g., a CRT, a flat panel, a projector, etc.). A block 838 includes some examples of technologies that may be supported via the LVDS interface 832 (e.g., serial digital video, HDMI/DVI, display port). The memory controller hub 826 also includes one or more PCI-express interfaces (PCI-E) 834, for example, for support of discrete graphics 836. Discrete graphics using a PCI-E interface has become an alternative approach to an accelerated graphics port (AGP). For example, the memory controller hub 826 may include a 16-lane (x16) PCI-E port for an external PCI-E-based graphics card. A system may include AGP or PCI-E for support of graphics.

The I/O hub controller 850 includes a variety of interfaces. The example of FIG. 8 includes a SATA interface 851, one or more PCI-E interfaces 852 (optionally one or more legacy PCI interfaces), one or more USB interfaces 853, a LAN interface 854 (more generally a network interface), a general purpose I/O interface (GPIO) 855, a low-pin count (LPC) interface 870, a power management interface 861, a clock generator interface 862, an audio interface 863 (e.g., for speakers 894), a total cost of operation (TCO) interface 864, a system management bus interface (e.g., a multi-master serial computer bus interface) 865, and a serial peripheral flash memory/controller interface (SPI Flash) 866, which, in the example of FIG. 8, includes BIOS 868 and boot code 890. With respect to network connections, the I/O hub controller 850 may include integrated gigabit Ethernet controller lines multiplexed with a PCI-E interface port. Other network features may operate independent of a PCI-E interface.

The interfaces of the I/O hub controller 850 provide for communication with various devices, networks, etc. For example, the SATA interface 851 provides for reading, writing or reading and writing information on one or more drives 880 such as HDDs, SDDs or a combination thereof. The I/O hub controller 850 may also include an advanced host controller interface (AHCI) to support one or more drives 880. The PCI-E interface 852 allows for wireless connections 882 to devices, networks, etc. The USB interface 853 provides for input devices 884 such as keyboards (KB), one or more optical sensors (see, e.g., the sensor 120 of FIG. 1), mice and various other devices (e.g., cameras, phones, storage, media players, etc.). On or more other types of sensors may optionally rely on the USB interface 853 or another interface (e.g., I²C, etc.).

In the example of FIG. 8, the LPC interface 870 provides for use of one or more ASICs 871, a trusted platform module (TPM) 872, a super I/O 873, a firmware hub 874, BIOS support 875 as well as various types of memory 876 such as ROM 877, Flash 878, and non-volatile RAM (NVRAM) 879. With respect to the TPM 872, this module may be in the form of a chip that can be used to authenticate software and hardware devices. For example, a TPM may be capable of performing platform authentication and may be used to verify that a system seeking access is the expected system.

The system 800, upon power on, may be configured to execute boot code 890 for the BIOS 868, as stored within the SPI Flash 866, and thereafter processes data under the control of one or more operating systems and application software (e.g., stored in system memory 840). An operating system may be stored in any of a variety of locations and accessed, for example, according to instructions of the BIOS 868. Again, as described herein, a satellite, a base, a server or other machine may include fewer or more features than shown in the system 800 of FIG. 8.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An apparatus comprising:
   a keyboard comprising keys adjacent to a left optical trackpad and different keys adjacent to a right optical trackpad wherein the left optical trackpad, responsive to object sensing, outputs a left optical trackpad signal and wherein the right optical trackpad, responsive to object sensing, outputs a right optical trackpad signal;
   assignment circuitry that, responsive to output of an optical trackpad signal by one of the optical trackpads that corresponds to object sensing of a sweeping motion, assigns a status to the optical trackpads that is a right hand dominant status wherein the one of the optical trackpads is the right optical trackpad or a left hand dominant status wherein the one of the optical trackpads is the left optical trackpad; and
   control circuitry that outputs one or more commands based at least in part on the status and at least one of the right optical trackpad signal and the left optical trackpad signal.

2. The apparatus of claim 1 wherein the at least two keys comprise an F key and wherein the at least two different keys comprise a J key.

3. The apparatus of claim 1 wherein the keyboard comprises a computer keyboard.

4. The apparatus of claim 1 wherein the assignment circuitry assigns the status based at least in part on receipt of an optical trackpad assignment signal output by the left optical trackpad or the right optical trackpad.

5. The apparatus of claim 4 wherein the optical trackpad assignment signal is responsive to object sensing that senses object sweeping.

6. The apparatus of claim 1 wherein the optical trackpad assignment signal is a first optical trackpad signal in a series of associated optical trackpad signals.

7. The apparatus of claim 6 wherein the first optical trackpad signal comprises a right optical trackpad signal and wherein the assignment circuitry assigns the status as the right hand dominant status.

8. The apparatus of claim 7 wherein the series of associated optical trackpad signals comprises at least one left optical trackpad signal.

9. The apparatus of claim 6 wherein the first optical trackpad signal comprises a left optical trackpad signal and wherein the assignment circuitry assigns the status as the left hand dominant status.

10. The apparatus of claim 9 wherein the series of associated optical trackpad signals comprises at least one right optical trackpad signal.

11. The apparatus of claim 1 wherein the one or more commands comprise one or more cursor movement commands.

12. The apparatus of claim 1 comprising another optical trackpad.

13. The apparatus of claim 1 comprising a keyboard and a joystick that is adjacent to keys of the keyboard.

14. A method comprising:
responsive to object sensing of a sweeping motion via a first optical trackpad of a keyboard, outputting a signal that assigns the first optical trackpad a primary status and a second optical trackpad of the keyboard a modifier status wherein the keyboard comprises keys adjacent to the first optical trackpad and different keys adjacent to the second optical trackpad and wherein the first optical trackpad and the second optical trackpad comprise a right optical trackpad and a left optical trackpad; and
moving a cursor rendered to a display based at least in part on the signal.

15. The method of claim 14 comprising outputting a signal responsive to sensing an object tapping at least one of the first optical trackpad and the second optical trackpad.

16. The method of claim 15 comprising responsive to the signal responsive to sensing the object tapping, selecting an item rendered to a display.

17. An apparatus comprising:
a processor;
memory accessible by the processor;
a display operatively coupled to the processor;
a keyboard operatively coupled to the processor wherein the keyboard comprises keys adjacent to a left optical trackpad and different keys adjacent to a right optical trackpad wherein the left optical trackpad, responsive to object sensing, outputs a left optical trackpad signal and wherein the right optical trackpad, responsive to object sensing, outputs a right optical trackpad signal;
assignment instructions stored in the memory and executable by the processor that, responsive to output of an optical trackpad signal by one of the optical trackpads that corresponds to object sensing of a sweeping motion, assign a status to the optical trackpads that is a right hand dominant status wherein the one of the optical trackpads is the right optical trackpad or a left hand dominant status wherein the one of the optical trackpads is the left optical trackpad; and
control instructions stored in the memory and executable by the processor that output one or more commands based at least in part on the status and at least one of the right optical trackpad signal and the left optical trackpad signal.

18. The apparatus of claim 1 comprising a wireless communication interface operatively coupled to the keyboard.

19. The apparatus of claim 1 comprising a wired communication interface operatively coupled to the keyboard.

* * * * *